Patented Aug. 7, 1928.

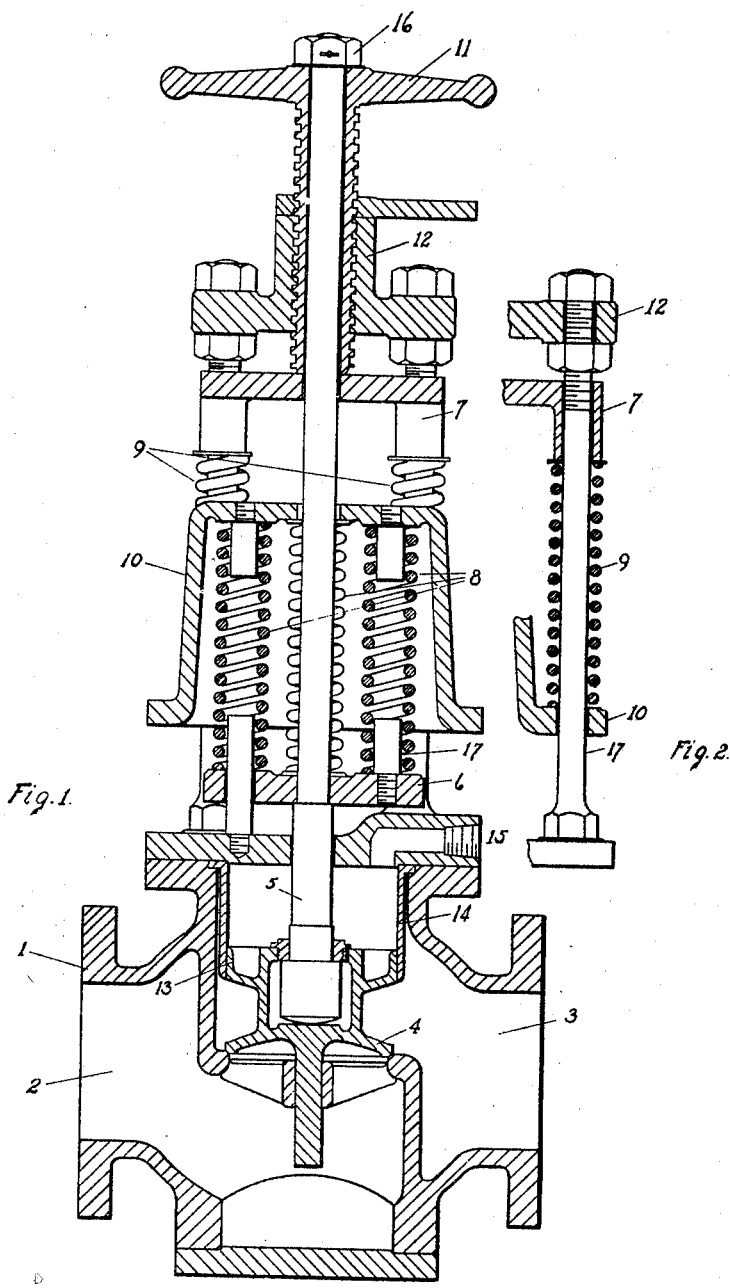

1,679,938

UNITED STATES PATENT OFFICE.

JAMES LEWIS KIMBALL, OF BEVERLY, MASSACHUSETTS, ASSIGNOR TO RUGGLES-KLINGEMANN MANUFACTURING COMPANY, OF SALEM, MASSACHUSETTS.

FLUID-PRESSURE RELIEF VALVE.

Application filed January 10, 1927. Serial No. 160,172.

My invention relates to fluid pressure relief valves and particularly to relief valves for protecting exhaust pressure systems of non-condensing turbines or other low pressure systems.

The invention has for one of its objects to provide a relief valve of a high lift characteristic having a large relieving capacity in comparison with its size, as compared with other valves heretofore used for this service.

Another object is to provide a relief valve of the spring loaded type having greater flexibility in the pressure counteracting means than heretofore produced, but at the same time, so arranging the pressure counteracting springs as to give compactness to the general design.

I obtain this object by providing an inner and an outer group of springs each group having several comparatively light weight springs, thereby, giving greater flexibility than what would be possible with a single heavy spring. I then arrange these springs in an inner and outer group with means to transmit tension of one group to the other, thereby securing the benefit of a comparatively long spring without materially increasing the overall dimensions.

A further object is in the novel arrangement of the adjusting means which permits the valve to be opened for free exhaust, simply by turning the adjusting screw in the opposite direction, and lifting the valve disc against the tension of the pressure counteracting springs.

Generally speaking spring loaded relief valves are of a very low lift characteristic due to the fact that when such valves lift back pressure is exerted on the top or outlet side of the disc which balances a part of the pressure under the disc thereby preventing a further lift of the valve without a further increase in pressure. For the above reason it has been found necessary to install relief valve of a size much larger than would be required with a valve having a higher lift characteristic.

My invention discloses novel means combined to produce a simple reliable relief valve of a high lift characteristic, the use of which permits of a much smaller valve being used and therefore results in considerable economy in the cost of valve and piping.

That the invention may be more fully understood, reference is had to the accompanying drawing forming a part of this specification.

Figure (1) of the drawing shows a vertical sectional view of my invention. Figure (2) shows the position and arrangement of the outer group of springs. In the drawing, (1) is the valve casing, (2) the inlet for pressure, (3) the outlet or exhaust to atmosphere, (4) is the valve disc, (5) is the valve stem, (6) is the lower spring plate, (7) is the upper spring plate, (8) is the inner group of springs, (9) is the outer group of springs, (10) is the connecting cylinder between the lower end of the outer group of springs and the upper end of the inner group of springs, (11) is the adjusting screw, and (12) is the stationary screw plate through which the adjusting screw is threaded.

It will be noted that by adjusting screw (11) in a clockwise direction screw plate (7) is forced downward on the tie rods and thereby compresses the outer group of springs (9), and as the lower end of these springs rest on the outturned flange of the cylinder (10), and that this cylinder is supported by the inner group of springs (8), that the cylinder will be forced downward and the inner group of springs compressed equally with that of the outer group.

The purpose of this arrangement of an inner and an outer group of springs is to get the effect of a long flexible spring in as compact a space as possible. The arrangement is such that all springs of both groups exert a corresponding counteracting force, and have a flexibility when under tension which prevents them from cramping the valve stem or otherwise interfering with the free lift of the valve disc.

It will be noted that spring plate (6) bears on a shoulder on valve spindle (5) and therefore exerts a force to hold valve disc (4) closed in proportion to the amount of tension applied to the springs by the adjusting screw (11).

While I have shown each group as containing four springs, it should be understood that the arrangement permits of a greater number of springs in each group, when required, to counteract higher pressures, thereby retaining the flexibility of the springs which would not be possible with the addition of heavier springs.

One of the objects of my invention being to obtain a high lift of the valve disc (4), it will be seen that this spring structure aids materially in this respect. As a further aid to securing a valve of the high lift characteristic, I have so arranged the construction of the valve disc that it is balanced to back or discharge pressure. To accomplish this result, I have extended the disc upward and formed a piston (13) at the top. This piston (13) is loosely fitted in a cylinder (14) and the cylinder is vented to the atmosphere at (15).

The effective pressure area of the piston (13) is the same as that of the disc (4), and as the upper side of the piston is subjected to atmospheric pressure only, it will be seen that variations in back pressure at the outlet of the valve above that of the atmosphere do not affect the lift of the disc. Assuming that there were no balancing piston (13), then as the disc started to lift there would be a back pressure in the outlet of the valve, and consequently above the valve disc, and this back pressure would retard a high lift of the disc. By balancing the disc to the outlet pressure, the full inlet pressure is effective for all degrees of lift.

Another advantage of the balancing cylinder and piston is that it acts as a dash pot which damps the action of the valve thereby preventing a too sudden opening and closing of the valve with its consequent hammering effect.

Oftentimes it is necessary to pipe the outlet of such valves a considerable distance in order to reach a safe place for such valves to vent. It will be readily seen that the longer the outlet connection the greater will be the back pressure on the valve where it is relieving. With my invention the capacity of the valve is unchanged regardless of the outlet pipe or the amount of back pressure in this line.

The principal service for which such valves are used is to protect low pressure housings of non-condensing turbines, and where the exhaust pressure is used for heating or process work. Under conditions of where no steam is required for industrial purposes, it is desirable to provide means of conveniently relieving the turbine of all back pressure and for this purpose I have provided novel means whereby the valve can be readily opened for free exhaust to the atmosphere without taking the tension off the pressure counteracting springs.

At the top of valve spindle (5) is a nut (16) securely fastened to this spindle, and by turning the adjusting screw in a counter-clockwise direction the valve disc is forcibly raised from its seat against the tension of the pressure counteracting springs, and a free exhaust to the atmosphere effected. This counter-clockwise adjustment of the adjusting screw (11) forcibly raises the disc (4) and the lower spring plate (6) against the tension of both the inner and outer group of springs, and consequently it may be said that the springs are adjustable in one direction to increase their tension to increase pressure setting, and are adjustable in the opposite direction to increase their tension to forcibly raise the valve disc (4) and hold it in an open position for free exhaust. This novel adjusting means is not only useful in holding the valve open for free exhaust but affords convenient means to raise the disc from its seat occasionally to make sure the valve is not stuck to its seat.

It will be seen by those skilled in the art that I have devised a novel relief valve structure enabling the user, because of its high lift characteristics, to use a comparatively smaller valve than what would be otherwise required. Furthermore, I have arranged a relief valve having additional decided advantages in that it can be easily and conveniently adjusted for pressure or for free exhaust to the atmosphere.

While I have described the use of my invention in connection with non-condensing turbines, I do not wish to be limited to such service as my invention is equally applicable as a relief valve for either high or low pressure and for any service for which a relief valve is required.

Having described my invention what I claim as new and desire to secure by Letters Patent, is,—

1. In a fluid pressure relief valve comprising a valve structure having an inlet and an outlet, a valve disc for normally preventing fluid pressure flow through said valve, a plurality of pressure counteracting springs divided into an inner and an outer group, overlapping each other, a cylinder surrounding the inner group, an upper inturned flange on said cylinder engaging the upper end of the inner group, and a lower outturned flange engaging the lower end of the outer group, a spring plate and means to adjust said plate to collectively adjust the tension on both the inner and outer group uniformly to vary the pressure setting of said valve.

2. In a fluid pressure relief valve comprising a valve structure having an inlet and an outlet, a valve seat and a valve disc normally engaging said seat, a plurality of pressure counteracting springs divided into an inner and an outer group each overlapping the other with means to transmit the tension of one group to the other, means to adjust the tension of one group to collectively adjust the tension on both groups uniformly, said spring adjusting means also providing means to lift said disc against the tension of said springs and to hold said valve in an open position.

3. In a fluid pressure relief valve comprising a valve structure having an inlet and an outlet, a valve seat and a valve disc normally engaging said seat, means to balance said valve disc to discharge pressure in the outlet of said valve, a plurality of pressure counteracting springs divided into an inner and an outer group each overlapping the other with means to transmit the tension of one group to the other, means to adjust the tension of one group of springs to collectively adjust the tension on both groups uniformly, said spring adjusting means also providing means to lift said disc against the tension of said spring and to hold said valve in an open position.

4. In a fluid pressure relief valve comprising a valve casing having an inlet and an outlet, a valve port in said casing between the inlet and outlet, a valve disc normally closing said port, springs for normally holding the valve disc closed against the inlet pressure, means for adjusting the tension of said springs, said spring adjusting means when operated in one direction compresses said springs to increase the pressure setting of the valve and when operated in the opposite direction compresses said springs in the opposite direction to hold said valve in an open position.

5. In a fluid pressure relief valve comprising a valve casing having an inlet and an outlet, a valve port in said casing between the inlet and outlet, a valve disc normally closing said port, springs for normally holding the valve disc closed against the inlet pressure, means for adjusting the tension of said springs, said spring adjusting means when operated in one direction compresses said springs to increase the pressure setting of said valve, and when operated in the other direction first decreases the pressure setting to its original value, and then compresses said springs in the opposite direction to hold said valve in an open position.

6. In a fluid pressure relief valve comprising a valve casing having inlet and outlet connections, a valve port in said casing between the inlet and the outlet, a valve disc normally closing said port, springs for normally holding the valve disc closed against the inlet pressure, means for adjusting the tension of said springs, said spring adjusting means when operated to one extreme compresses the springs in one direction thereby holding the valve disc in an open port position, and when operated in the other direction first closes the valve port and then adjusts the springs in the opposite direction to increase the pressure setting of the valve.

JAMES LEWIS KIMBALL.